Patented June 24, 1930

1,766,403

UNITED STATES PATENT OFFICE

WERNER SCHULEMANN, OF VOHWINKEL-HAMMERSTEIN, AND AUGUST WINGLER AND FRITZ MIETZSCH, OF ELBERFELD, GERMANY, ASSIGNORS TO WINTHROP CHEMICAL COMPANY, INC., OF NEW YORK, N. Y.

PHARMACEUTICAL PRODUCT

No Drawing. Application filed August 24, 1925, Serial No. 52,228, and in Germany September 11, 1924.

The present invention relates to new compounds of the diazine, oxazine, thiazine, acridine and xanthene series, i. e., the series including aromatic compounds containing the grouping

wherein one A represents an element of the group N, S, and O, and the other A represents an element of the group C and N, having as a substituent the group:

wherein X represents hydrogen, an alkyl group, or other monovalent substituent, $R_1$ an alkylene residue, $R_2$ hydrogen or an alkyl, $R_3$ an alkyl group.

We have discovered that these compounds generally possess valuable pharmaceutical properties.

The manufacture of our new compounds can be effected in several ways; for instance, an amino derivative of a compound of one of the above mentioned series may be caused to be acted upon by an aminoalkylhalogenide having the general formula:

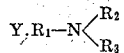

wherein Y represents a halogen atom, $R_1$ an alkylene residue, $R_2$ hydrogen or an alkyl group, $R_3$ an alkyl group or an aminoalkyl group. Instead of the aminoalkylhalogenide one may use in this process the salt of an aminoalkylhalogenide with an inorganic acid or a substitution product of the aminoalkylhalogenide such as the bromoethylphthalimide. In the last case phthalic acid is to be split off subsequently.

The manufacture of our new compounds can be furthermore effected by converting such amino compounds as are suitable intermediate products for the manufacture of amino derivatives of the above mentioned series into aminoalkylamino derivatives and subsequently transforming the latter into the corresponding diazine, oxazine, thiazine, acridine or xanthene compounds. We are aware of the fact that several other methods for preparing our new compounds are obvious which, however, we do not mention specifically.

Said amino-derivatives, both primary and secondary, can be converted into our new compounds. Moreover, it is also possible to use amino derivatives which contain not only one but several amino-groups and likewise the side-chain carrying the aliphatic nitrogen, whether occurring only once or several times, may be either straight or branched and the aliphatic nitrogen atom may happen to be in the $\beta$ or $\gamma$- position or even further removed from the amino-groups in the said amino derivatives.

*Example 1*

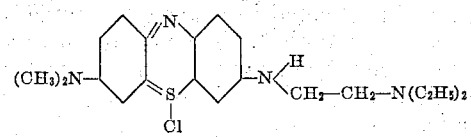

For the preparation of mono-N-diethyl-aminoethyl-aniline 93 parts by weight of aniline are heated under reflux for 12 hours with 135 parts by weight of diethylaminoethyl chloride in 800 parts by weight of dry benzene. The hydrochloride of diethyl-amino-ethyl-aniline thus produced is filtered off, washed with a little benzene, dissolved in water, precipitated as the free base with potassium carbonate and dissolved in a little benzene for the purpose of eliminating any quaternary ammonia compound which may have been salted out. After drying the base with potassium carbonate it distils as a colorless liquid of boiling point 121–123° C. at 5 mm. with very little preliminary distillation of volatile matter or residue remaining.

The mono - N - diethylamino - ethyl - aniline thus obtained is caused to be acted upon by para-amino-dimethyl-aniline in the presence of sodium thiosulfate, zinc chloride and chromic acid. The thiazine dyestuff thus produced is separated as the zinc chloride double salt in good yield and of high purity. On eliminating the zinc, the dyestuff is obtained as a bronze colored powder, easily soluble in water and of a blue shade, similar to that of methylene blue

*Example 2*

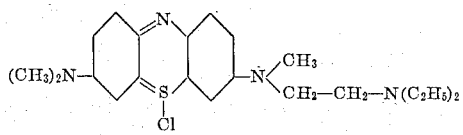

For the manufacture of N-methyl-diethylaminoethylaniline 107 parts by weight of methylaniline are heated under reflux for 24 hours with 135 parts by weight of diethylaminoethylchloride in 250 parts by weight of dry benzene. The hydrochloride of methyldiethylaminoethylaniline which separates is worked up as in Example 1. The free base, a colorless liquid, distils at 124–126° C. at 5 mm. pressure, with very little preliminary distillation of volatile impurity.

The same compound is obtained by first converting monomethylaniline into hydroxyethyl-methylaniline by treatment with chloroethyl alcohol or ethylene oxide, transforming this compound into chloroethyl-methylaniline by the action of thionyl chloride and thereupon substituting the chlorine by the diethylamine radicle by means of diethylamine. Methyldiethylaminoethylaniline obtained by this method possesses the same boiling point of 124–126° C. at 5 mm. pressure as the product of the previous reaction.

The manufacture of the corresponding dyestuff is effected in exactly the same manner as in Example 1. The new dyestuff after being freed from zinc is a lustrous bronze powder, easily soluble in water and of a blue shade.

*Example 3*

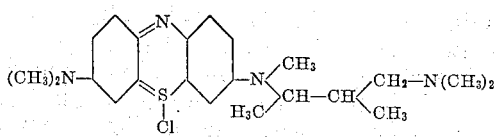

For the manufacture of N-methy-α-dimethylamino-β-methyl-γ-butylaniline 107 parts by weight of methyl-aniline are heated for about 24 hours at 110–120° C. with 200 parts by weight of the hydrochloride of α-dimethylamino-β-methyl-γ-chlorobutane, until the completely solidified melt which is finally formed has become entirely soluble in water. The reaction product is dissolved in water and the solution is rendered alkaline with potassium carbonate. The free base which separates is further treated as in Example 1. It distils as a colorless liquid at 133–135° C. at 6 mm. pressure, after the first runnings of methylaniline have distilled off. Precisely the same compound can be obtained by boiling methylaniline with the α-dimethyl-amino-β-methyl-γ-chlorobutane for 30 hours in benzene solution. This compound can be converted in the customary manner, with the intermediate production of the p-nitroso-compound, into p-amino-N-methyl-α-dimethyl - amino - β - methyl - γ - butylaniline. The corresponding thiazine dyestuff is prepared from the latter compound using dimethylaniline instead of p-aminodimethylaniline, following the same procedure as described in Example 1.

The dyestuff, after being freed from zinc is a lustrous dark blue powder, easily soluble in water and of a blue shade.

The customary methods for the manufacture of oxazines and diazines can be successfully applied to the above described amines, their nitroso- and p-amino-derivatives, the respective oxazine and diazine derivatives being produced with satisfactory yields. Instead of the herein described polyamines, other amines of similar constitution can be employed, such for example as the piperidine compounds. Thiazines, oxazines, diazines, acridines, etc., containing free amino groups, likewise yield polyamino compounds by the application in the appropriate manner to the final compounds of the methods described herein for use only with primary and secondary arylamines. If hydroxylated arylamines are selected as the starting material for the manufacture of polyamines, it is also possible to obtain by the application of the customary methods, compounds belonging to the xanthene series. Thus on melting N-diethylaminoethyl-methyl-m-aminophenol with phthalic acid, compounds of the rhodamine series are produced.

The following are further methods of execution of the processes for which we claim protection:—

*Example 4*

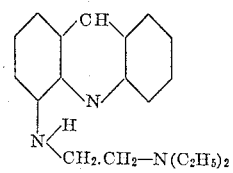

Molecular proportions of 4-aminoacridine and the hydrochloride of diethylaminoethyl chloride are melted together in a closed vessel and the temperature is maintained for 7–8 hours at 110–120° C. The product of the reaction is dissolved in warm dilute hydrochloric acid and filtered from an insoluble dark colored material. The new base is salted out from the filtrate by means of potassium carbonate, extracted with ether and after distilling off the ether it is purified by distillation in a high vacuum. The product is a viscous golden yellow oil which boils at 215° C. under 1 mm. pressure. It is soluble in ether and forms with ethereal hydrochloric acid a faintly violet colored hygroscopic diacid salt, which is readily soluble in water with a weak wine-red coloration.

The 4-aminoacridine of a melting point 105–106° C. and boiling under 1 mm. at 183–184° C. is produced by reduction of 4-nitroacridine with stannous chloride and hydrochloric acid. The nitro-compound is most advantageously prepared by the condensation of o-bromonitrobenzene and o-aminobenzaldehyde, ring formation being effected by the action of concentrated sulfuric acid. Another method for the manufacture of 4-aminoacridine was described recently by Clemo Perkin Jr. and Robert Robinson J. C. S. 125, 1751 (1924).

*Example 5*

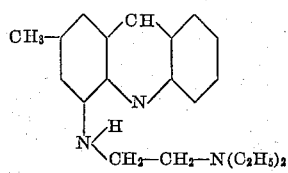

2-methyl-4-aminoacridine, on treatment as described in Example 4, is converted into a golden yellow viscous oil of boiling point 235° C. under 3 mm. pressure. The product forms a faintly violet colored hygroscopic diacid salt with hydrochloric acid, which dissolves readily in water with a weak yellow coloration.

2-methyl-4-aminoacridine melting point 111° C. boiling point 197° C. under 1 mm. pressure is prepared according to either of the two methods outlined above and crystallizes from benzine, ether, alcohol, or acetone in bright yellow prisms or needles.

*Example 6*

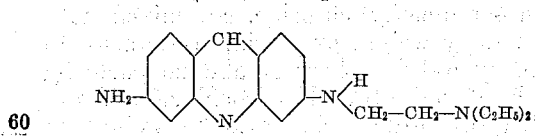

3.6-diaminoacridine is dissolved in 30 to 40 times the amount of cyclohexanol at about 120° C. the solution is carefully cooled to 90° C., when the molecular quantity of diethyl-aminoethyl chloride is added and stirring is continued for 2 days at 90° C. After cooling the separated hydrochloride is dissolved in the minimum amount of water and fractionally precipitated with concentrated ammonia. The yellow base, which easily crystallizes on rubbing the sides of the vessel, possesses the above formula and is distinguished from the starting compound by its greater solubility in water and by the property of being precipitated by ammonia with greater difficulty.

A similar product is obtained by dissolving 3.6-diaminoacridine in alcohols, e. g. amyl alcohol, treating with the molecular quantity of sodium acetate, and if necessary a little copper salt and stirring for several hours with the molecular quantity of diethylaminoethyl chloride at about 100° C. The liquid is filtered hot and on cooling, a little of the unattacked starting material separates; the solution is thereupon rendered acid with hydrochloric acid, the amyl alcohol is blown off and the aqueous solution is then concentrated, when the hydrochloride of the new base will crystallize. It is converted into the above mentioned base by dissolving in the minimum quantity of water and precipitating with an excess of strong ammonia.

*Example 7*

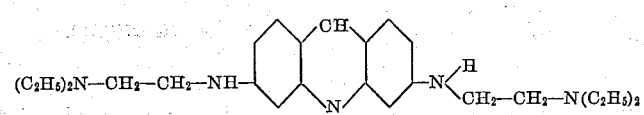

For the manufacture of m-amino-mono-N-diethylaminoethyl-aniline 100 grams of m-nitraniline in 500 cc. of benzene are added to 98 grams of diethylaminoethyl chloride in 100 cc. of benzene and the whole heated to boiling for 24 hours. The hydrochloride which crystallizes on cooling is dissolved in water and the solution extracted with benzene. The separated aqueous solution of the hydrochloride of m-nitro-mono-N-diethyl-aminoethyl-aniline is thereupon reduced with iron filings and acetic acid. The reduced liquid is freed from iron, rendered slightly acid with hydrochloric acid and evaporated to a small bulk, after which potassium carbonate is added and the base is extracted with benzene. After the elimination of the benzene the product, m-amino-mono-N-diethyl-amino-ethyl-aniline, distils as a water-clear mobile liquid of boiling point 158.5–159.5° C. under 1 mm. pressure.

For the manufacture of the corresponding dyestuff 20 grams of the above described base, 16 grams of glycerine, 16 grams of zinc chloride and 12 grams of anhydrous oxalic acid are stirred together, and the whole is slowly heated during 2-3 hours on an oil bath to a maximum temperature of 170° C. The mass is thereupon lixiviated with hot water and hydrochloric acid, the liquor is filtered and salted out with common salt. The redissolved dyestuff is treated with nitrobenzene and sodium carbonate solution in a separating funnel, whereby the zinc free base is dissolved by the nitrobenzene, from which it can be again extracted with dilute hydrochloric acid. The solution is evaporated in vacuo, when the dyestuff remains as a brown hygroscopic powder, very readily soluble in water with a pure yellow coloration.

*Example 8*

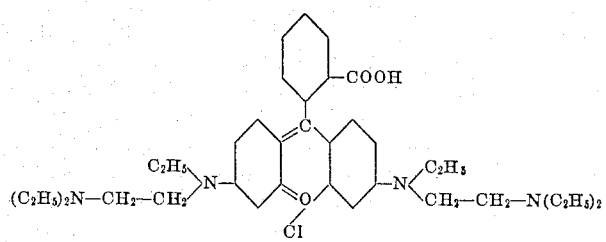

and:—

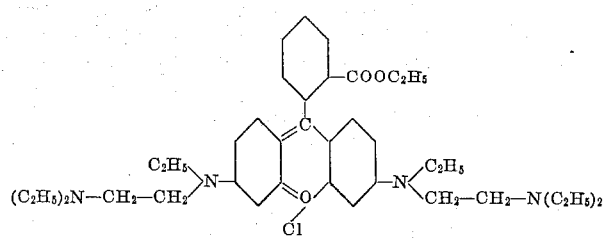

For the manufacture of m-hydroxy-N-diethylamino-ethyl-ethylaniline 102 grams of m-hydroxy-N-ethylaniline are dissolved in 150 cc. of benzene on the water bath, 100 grams of diethylamino-ehtyl chloride in 150 cc. of benzene are added and the whole heated to boiling for a day. On cooling, the benzene is decanted and the free base is liberated from the aqueous layer by the addition of potassium carbonate and extracted with benzene. After the elimination of the benzene the new base distils as a highly refracting liquid of boiling point 180–182° C. under 4 mm. pressure. At first it forms a viscous oil, but on standing for several days it solidifies to a white crystalline mass.

For the preparation of the corresponding dyestuff 40 grams of the base are heated on an oil bath with constant stirring with 50 grams of phthalic acid anhydride for 3–4 hours to a maximum temperature of 175° C. After cooling, the brittle solidified melt is powdered and advantageously dissolved in nitrobenzene at 70–80° C. The solution is extracted several times with sodium carbonate solution at 40–50° C. in order to eliminate phthalic acid and to liberate the color base. The latter is thereupon extracted from the nitrobenzene with dilute hydrochloric acid. The acid solution is evaporated to dryness in vacuo, when the dyestuff remains as a reddish brown, hygroscopic powder, which dissolves very readily in water with a clear rhodamine coloration.

For the esterification of the carboxyl group 10 grams of the above mentioned hydrochloride are dissolved in 50 grams of absolute alcohol and hydrochloric acid gas is passed through the solution for one day whilst cooling with ice and for a further day whilst boiling the solution. After evaporation to dryness in vacuo the remaining dyestuff salt is only distinguishable from the starting material by a slightly yellower coloration of the solution in water. However, the corresponding dyestuff base is characterized as compared with the unesterified base by its very ready solubility in nitrobenzene, as well as by the startlingly much more violet coloration in nitrobenzene.

*Example 9*

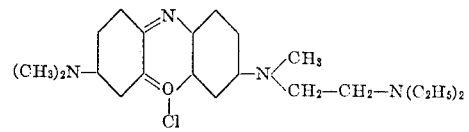

22.2 parts by weight of m-hydroxy-N-(diethylaminoethyl-methyl)-aniline (oil boiling at 156–157° C. under 1 mm. pressure) obtained from m-hydroxy-N-methylaniline and diethylaminoethyl-chloride, are mixed with 50 parts by weight of glacial acetic acid, 10 parts by weight of water and 20 parts by weight of concentrated hydrochloric acid and heated to boiling. 28 parts by weight of nitroso-dimethylaniline hydrochloride are added and treating is continued for some hours. The mixture is diluted with water and the dyestuff is precipitated with a zinc chloride solution which is redissolved and freed from zinc with sodium carbonate. It is a bronze powder soluble in water with a blue coloration.

*Example 10*

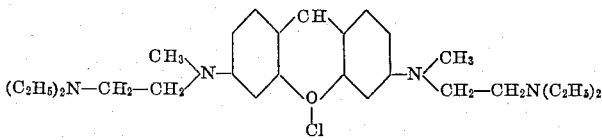

Two molecules of m-hydroxy-N-(diethyl-amino-ethyl-methyl)-aniline are boiled together with two molecules of a 50 per cent aqueous oxalic acid and one molecule of formic aldehyde in alcoholic solution during 24 hours, water is added, and the diphenyl-methane compound is salted out, dissolved in benzene and the benzene is distilled off. The residue is introduced whilst cooling into 4 parts by weight of concentrated sulfuric acid and the yellowish-brown solution is heated on the water bath. It is allowed to cool to 27° C. and oxidized by adding dried sodium nitrite at 27–30° C. whilst stirring. The acid solution is poured on ice and the zinc chloride salt of the dye is isolated, purified and freed from zinc.

We claim:—

1. A process of making therapeutically valuable derivatives, comprising reacting upon an amino derivative of an aromatic compound of the series containing the grouping

wherein one A represents an element of the group N, S, and O, and the other A represents an element of the group C and N, with an aminoalkylhalogenide compound of the general formula

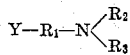

wherein Y represents a halogen atom, $R_1$ an alkylene residue; $R_2$ represents hydrogen or an alkyl group and $R_3$ stands for an alkyl group.

2. As new products aromatic compounds containing the grouping

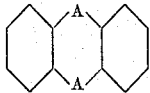

wherein one A represents an element of the group N, S, and O, and the other A represents an element of the group C and N, and substituted by the group:

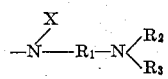

wherein X represents hydrogen, an alkyl group, or other monovalent substituent, $R_1$ an alkylene residue, $R_2$ hydrogen or an alkyl group, and $R_3$ an alkyl group.

3. As new products compounds of the thi-azine series substituted by the group:

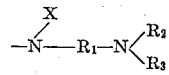

wherein X represents hydrogen, an alkyl group, or other monovalent substituent, $R_1$ an alkylene residue, $R_2$ hydrogen or an alkyl group and $R_3$ an alkyl group.

4. As new products compounds of the thi-azine series substituted by the group:

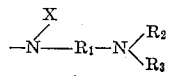

wherein X stands for hydrogen or an alkyl group, $R_1$ for an alkylene residue, $R_2$ and $R_3$ for methyl or ethyl groups.

5. As new products compounds of the general formula:

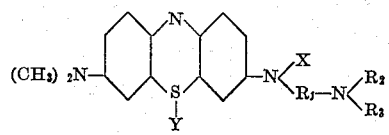

wherein Y stands for an acid radicle, X for hydrogen or an alkyl group $R_1$ for an alkylene residue possessing at least two but not more than five carbon atoms, $R_2$ and $R_3$ for methyl or ethyl groups.

6. As new products compounds of the general formula:

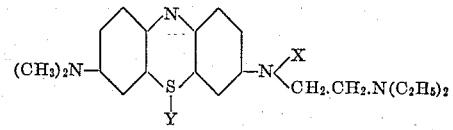

wherein Y stands for an acid radicle, X for hydrogen or methyl.

7. As a new product the compound of the general formula:

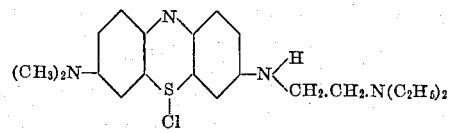

which in a dry state is a bronze-colored powder, easily soluble in water.

In testimony whereof we have hereunto set our hands.

WERNER SCHULEMANN.
AUGUST WINGLER.
FRITZ MIETZSCH.